United States Patent
Payrits et al.

(10) Patent No.: US 7,103,676 B2
(45) Date of Patent: Sep. 5, 2006

(54) USER-IDENTIFIER TRANSLATOR AND LINKING APPARATUS FOR XML-BASED SERVICES AND CORRESPONDING METHOD

(75) Inventors: Szabolcs Payrits, Kópháza (HU); Magdolna Gerendai, Budapest (HU)

(73) Assignee: Nokia Corporation, Espoo (FI)

( * ) Notice: Subject to any disclaimer, the term of this patent is extended or adjusted under 35 U.S.C. 154(b) by 397 days.

(21) Appl. No.: 10/287,462

(22) Filed: Nov. 4, 2002

(65) Prior Publication Data
US 2004/0087336 A1 May 6, 2004

(51) Int. Cl.
*G06F 15/16* (2006.01)

(52) U.S. Cl. ........................... 709/236; 709/206

(58) Field of Classification Search ........ 709/206–207, 709/220–225, 236
See application file for complete search history.

(56) References Cited

U.S. PATENT DOCUMENTS

| | | | |
|---|---|---|---|
| 6,061,789 A | 5/2000 | Hauser et al. | |
| 6,416,328 B1 | 7/2002 | Callahun | |
| 6,471,521 B1 * | 10/2002 | Dornbush et al. | 434/322 |
| 6,535,746 B1 * | 3/2003 | Yu et al. | 455/466 |
| 6,591,291 B1 * | 7/2003 | Gabber et al. | 709/206 |
| 6,907,564 B1 * | 6/2005 | Burchhardt et al. | 715/513 |
| 2002/0186696 A1 * | 12/2002 | Lim | 370/395.52 |

OTHER PUBLICATIONS

"Liberty Alliance: Novell's Liberty-enabled Identity Management Solution"; Novell, Inc.; Provo, Utah; 2002; pp. 1-14.

"Wireless Village, The Mobile IMPS Initiative, System Architecture Model, Version 1.1"; Ericsson, Motorola and Nokia; 2001-2002; pp. 1-10.

"Wireless Village, The Mobile IMPS Initiative, White Paper"; Ericsson, Motorola and Nokia; 2001-2002; pp. 1-12.

"SOAP: The Simple Object Access Protocol"; Aaron Skonnard; *Microsoft Internet Developer*; printed from the Internet Jan. 2000; pp. 1-13.

"XML Schema Part 0: Primer"; David Fallside; W3C; May 2, 2001; pp. 1-85.

"XML Schema Part 1: Structures"; Thompson et al.; W3C; May 2, 2001; pp. 1-176.

"XML Schema Part 2: Datatypes"; Biron et al.; W3C; May 2, 2001; pp. 1-138.

"Extensible Markup Language (XML) 1.0 (Second Edition)"; Bray et al.; W3C; Oct. 6, 2000; pp. 1-44.

(Continued)

*Primary Examiner*—Dung Dinh
(74) *Attorney, Agent, or Firm*—Ware, Fressole, Van Der Sluys & Adolphson LLP

(57) ABSTRACT

A method for communicating a message directed to or concerning a user (in which case the message may be a core service request), from a source entity (11) in a source system to a target entity (17) in a target system, the user having a first user identifier known to the source entity (11), and a second user identifier used by the target entity (17) to identify the user in the target system, with the second user identifier not known to the source entity (11), the method including: a step (71 81 82 83) in which the source entity (11) encapsulates the message in a first message envelope containing an element (52) including the first user identifier and an element (53) containing a user identifier placeholder, and also a link ($L_{12}$) relating the first user identifier and the user identifier placeholder.

23 Claims, 5 Drawing Sheets

OTHER PUBLICATIONS

"XML Linking Language (XLink) Version 1.0"; DeRose et al.; W3C; Jun. 27, 2001; pp. 1-29.

"XML Path Language (Xpath)"; Clark et al.; W3C; Nov. 16, 1999; pp. 1-27.

"Multipurpose Internet Mail Extensions (MIME) Part One: Format of Internet Message Bodies"; Freed et al.; Network Working Group; Nov. 1996; pp. 1-31.

"3rd Generation Partnership Project; Technical Specification Group Terminals; Multimedia Messaging Serice (MMS); Functional Description; Stage 2 (Release 5)"; 3GPP TS 23.140, V5.5.0; published by 3GPP; Valbonne, France; Dec. 2002; pp. 1-155.

"Simple Object Access Protocol (SOAP) 1.1"; Don Box et al.; W3C; May 8, 2000; pp. 1-37.

* cited by examiner

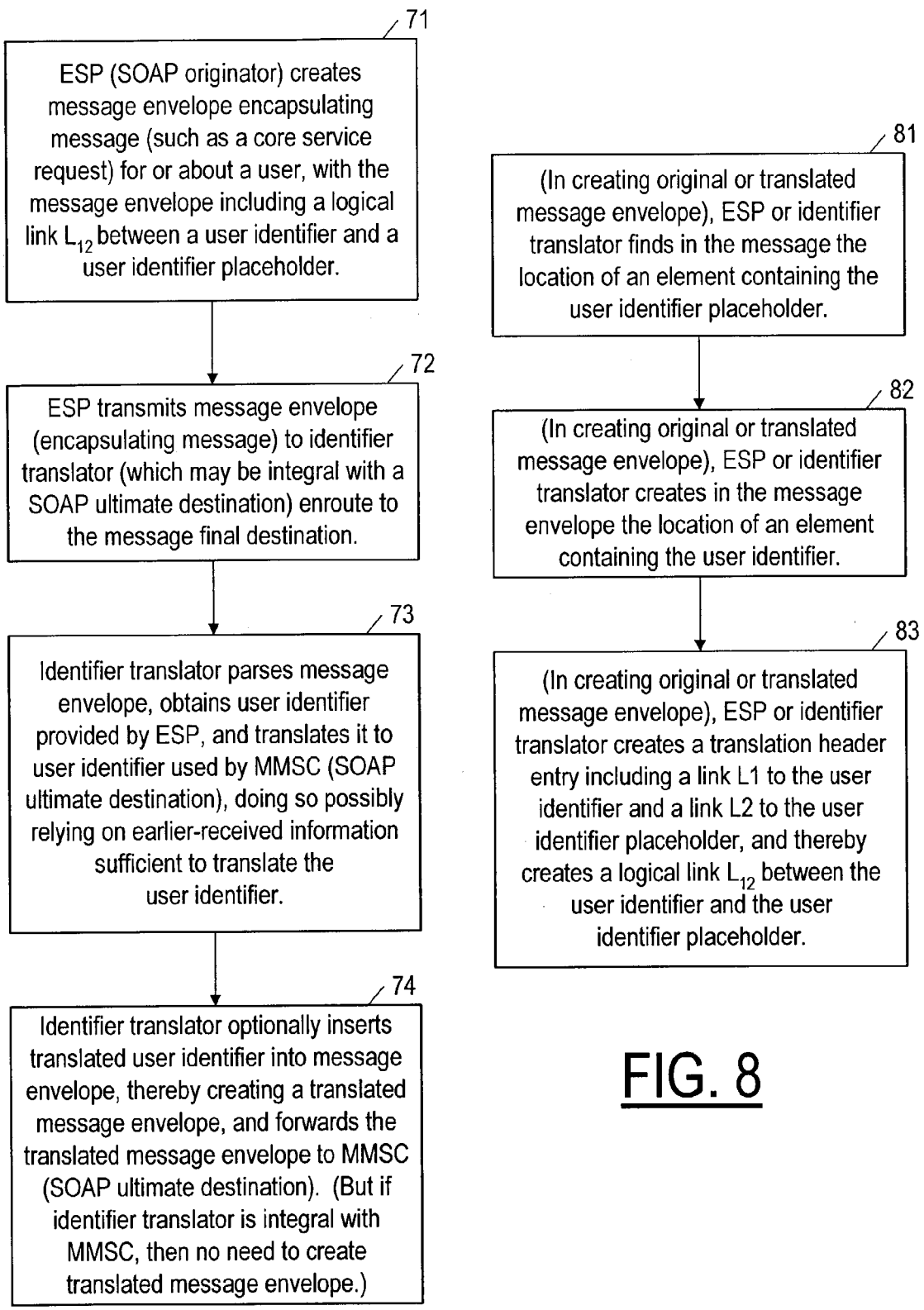

USER-IDENTIFIER TRANSLATOR AND LINKING APPARATUS FOR XML-BASED SERVICES AND CORRESPONDING METHOD

FIELD OF THE INVENTION

The present invention pertains to the use of user identifiers used by communication systems to identify users, and more particularly to translating user identifiers between interconnecting communication systems or between different entities knowing the same user by different user identifiers.

BACKGROUND OF THE INVENTION

Automatic translation of a user identifier used in connection with a cellular network, an identifier such as the mobile station integrated services digital network number (MSISDN), and an identifier for the same user for use in connection with obtaining services from third party service providers (as opposed to the network operator) can be useful in some situations.

For example, a mobile user may wish to have a (third party) Internet service provider such as yahoo.com, called here an external service provider (ESP) such as an Internet Service Provider or ISP, provide weather reports according to some regular schedule. To arrange for the weather reports (multimedia messages), the mobile user connects to the Internet (via the cellular communication system) and sends yahoo.com a request that the weather reports be provided (according to a specified schedule) but without indicating the user's MSISDN, and instead indicating only the user's e-mail address (provided locally by Yahoo). The user might not want to tell the ESP the user's MSISDN in order to keep the MSISDN from becoming generally known, which would possibly result in the user being spammed (and having to pay for the spam).

Thus, it would be helpful to have a way to enable a mobile station in a cellular communication system to receive messages from an ESP without the ESP knowing the identifier of the mobile station used by the cellular communication system.

SUMMARY OF THE INVENTION

Accordingly, in a first aspect of the invention, a method is provided for communicating a message, directed to or concerning a user, from a source entity to a target entity, the user having a first user identifier known to the source entity and a second user identifier used by the target entity, wherein the second user identifier is not known to the source entity, the method including a step in which the source entity creates a first message envelope encapsulating the message, with the first message envelope containing an element including the first user identifier and an element containing a user identifier placeholder, and also containing a link relating the first user identifier and the user identifier placeholder.

In accord with the first aspect of the invention, the first message envelope may be constructed according to a protocol based on an extensible markup language (XML).

Also in accord with the first aspect of the invention, the method may also include a step in which an identifier translator parses the first message envelope to determine the first identifier, and based on the first user identifier, translates the first user identifier into the second user identifier.

Also in accord with the first aspect of the invention, the method may also include a step in which the identifier translator creates a second message envelope from the first message envelope, the second message envelope differing from the first message envelope in that it includes an element containing the second user identifier instead of an element containing the first user identifier.

Still also in accord with the first aspect of the invention, the first user identifier may be the user identifier used by the source entity to identify the user. Further, the translation of the first user identifier into the second user identifier may be based on the first user identifier and a cross reference to the second user identifier.

Also still in accord with the first aspect of the invention, the first user identifier may be an encrypted form of the second user identifier. Further, the translation of the first user identifier into the second user identifier may be based on decrypting at least a part of the first user identifier.

In a second aspect of the invention, a method is provided for use in communicating a message, directed to or concerning a user, the method including: a step of finding in the message the location of an element containing a user identifier placeholder; a step of creating in a message envelope the location of an element containing the user identifier; and a step of creating a translation header entry including a link to the user identifier and a link to the user identifier placeholder, and thereby creating a logical link between the user identifier and the user identifier placeholder.

In accord with the second aspect of the invention, the message envelope may be created according to a protocol based on an extensible markup language (XML).

Also in accord with the second aspect of the invention, the data element containing a value for the user identifier may be for example a Liberty token or an IDElement element (as defined by the invention).

Also still in accord with the second aspect of the invention, the linking may be performed for example using XPath or "by-value" linking.

In a third aspect of the invention, a data structure is provided for use by a method for communicating a message directed to or concerning a user, the data structure characterized in that it comprises: an element containing a user identifier placeholder; an element containing a user identifier; and a translation header entry including a link to the user identifier and a link to the user identifier placeholder.

In accord with the third aspect of the invention, the message envelope may be created according to a protocol based on an extensible markup language (XML).

In a fourth aspect of the invention, an apparatus is provided, comprising means for performing the steps of the method provided by the first aspect of the invention.

In a fifth aspect of the invention, an apparatus is provided, comprising means for performing the steps of the method provided by the second aspect of the invention.

In a sixth aspect of the invention, an apparatus is provided for creating or sending or receiving a signal corresponding to a data structure according to the third aspect of the invention.

Thus, the invention provides a method and apparatus for linking user identifiers valid in different systems and described by different technologies, and also for translating user identifiers between systems and technologies, such as between a cellular communication system in which a mobile station interfaces with an operator network via a radio access network and the Internet communication system to which the operator network is connected, and by which an external service provider (such as an ISP) attached to the Internet can communicate with elements of the operator network or even the mobile station.

The invention exploits the fact that for extensible markup language (XML) based messaging protocols, different parts of a service request may be separated and processed individually; it is this separability that makes possible having an identifier translator according to the invention for translating identifiers between two systems connected via web services protocols, such as the simple object access protocol (SOAP), and for doing so independently of a core service request (i.e. for example a request for multimedia or a user location query). (A core service request is the body of a service request, such as a service request to send an MMS message, as opposed to parts of the service request providing supplementary service information, such as authentication, billing, and logging.)

With the invention, it is possible to have different user identifiers (pseudonyms) for use with external service providers connected e.g. to the Internet on the one hand, and cellular operators on the other, even for existing web service protocols, such as the existing multimedia messaging protocol seven (MM7).

BRIEF DESCRIPTION OF THE DRAWINGS

The above and other objects, features and advantages of the invention will become apparent from a consideration of the subsequent detailed description presented in connection with accompanying drawings, in which:

FIG. 7 is a flowchart of a method for communicating a message from the ESP to the mobile station, including the step of creating a message envelope encapsulating the message; and FIG. 8 is a flowchart showing the step of creating the message envelope in more detail.

BEST MODE FOR CARRYING OUT THE INVENTION

Figure 1:
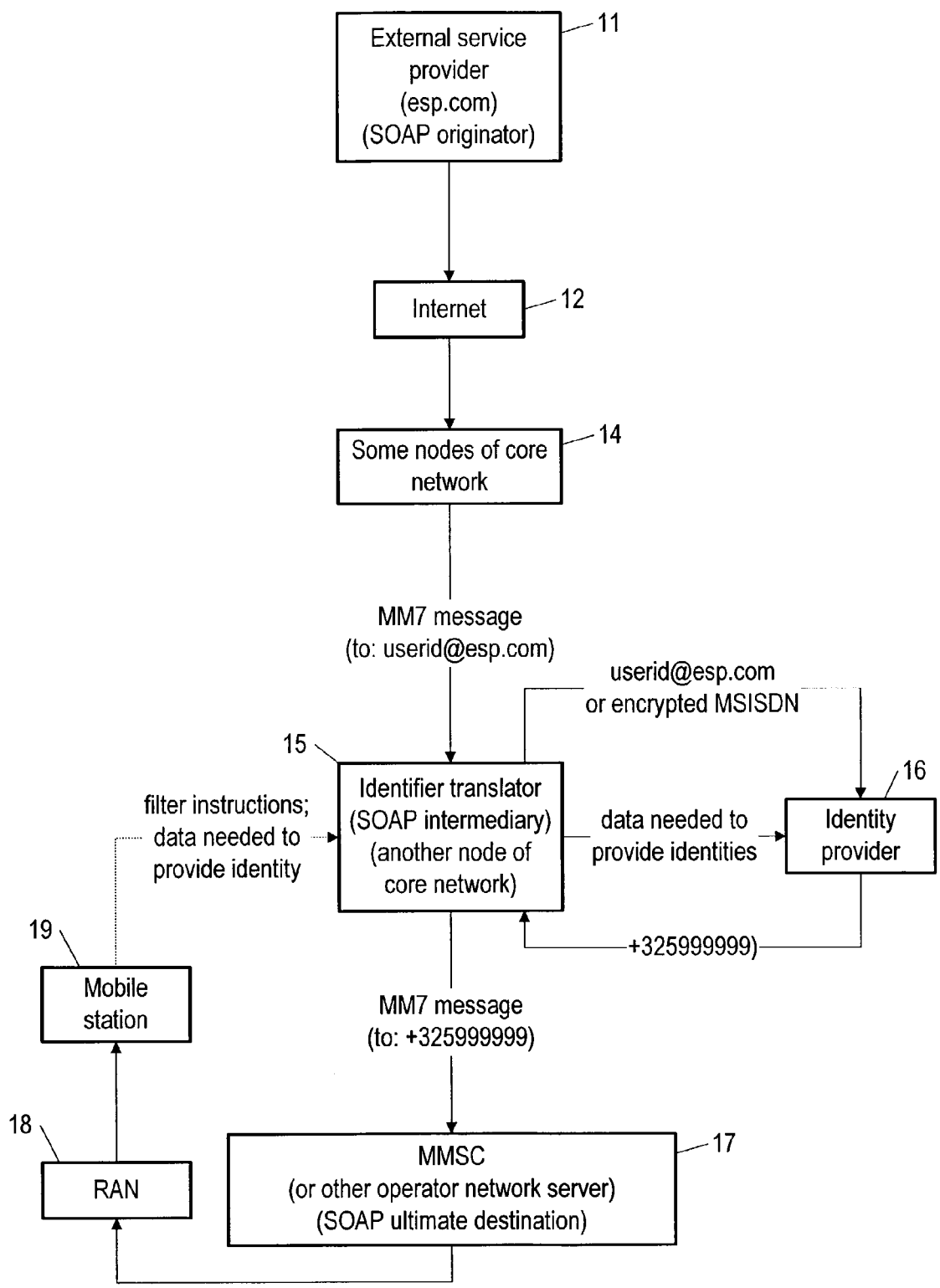
FIG. 1 is a block diagram illustrating an external service provider and an identifier translator cooperating according to the invention to provide a message to a mobile station from a source, such as the external service provider itself, that is typically not a subscriber to the communication system to which the mobile station is a subscriber, but at any rate does not know the user identifier of the mobile station used by the communication system to which the mobile station is a subscriber but instead knows the mobile station by some other user identifier.

Referring now to FIG. 1, according to the invention an identifier translator 15 translates a user identifier userid@esp.com of a mobile station 19, known to an external service provider (ESP) 11, such as an Internet Service Provider (ISP), to a user identifier +325999999 for the same mobile station 19 known to a multimedia mobile switching center (MMSC) 17 of a cellular communication system and not known to the ESP 11, the identifier +325999999 being the mobile station integrated services digital network number (MSISDN) for the mobile station 19. The identifier used by the ESP 11, userid@esp.com, is included in a message, preferably what is here called a SOAP (simple object access protocol) envelope, i.e. a message according to the SOAP protocol including a header and a body (as illustrated and discussed below in connection with FIGS. 2–6). The message is sent by the ESP to the mobile station via a path that includes (one or more nodes of) the Internet 12, possible nodes 19 of the core network of the cellular communication system, the identifier translator 15, the MMSC 17 (a server of the operator network using the basic infrastructure of the core network of the cellular communication system), and the radio access network (RAN) 18 of the cellular communication system. In performing the translation, the identifier translator 15 is shown as relying on an identity provider 16 to convert the user identifier known or used by the ESP 11 into the user identifier MSISDN used by the MMSC 17 of the operator network of the cellular communication system. The identity provider 16 can be, for example, a facility for linking identities across various systems such as a facility according to the so-called Liberty Alliance project (see novell.com white paper, "Liberty Alliance: Novell's Liberty-enabled Identity Management Solution") or a facility according to the so-called Wireless Village initiative (see e.g. the white paper, "Wireless Village: the Mobile IMPS Initiative" at www.wireless-village.org), and can be integral with or separate from the identifier translator 15. Alternatively, instead of using the identity provider 16 to link identities across communication systems, the ESP can be provided by the user or another entity with the user's MSISDN in encrypted form, and the ESP can then include the encrypted MSISDN in the SOAP envelope. Then, if the identity provider 16 has been entrusted by the user with the key to decrypt the encrypted user MSISDN, the identity provider can simply decrypt the MSISDN, rather than having to link/relate identities across communication systems.

It should be understood that the use of an e-mail address and an (unencrypted) MSISDN are only examples of user identifiers. The invention comprehends translating any kind of information identifying or associated with a user in one communication system or technology with any kind of information identifying or associated with the user in another communication system or technology. For example, as described below, the user identifier known (but not necessarily used in) the first communication system can be a liberty token or an encrypted MSISDN.

According to the invention in the preferred embodiment, the user is able to indicate to the identifier translator 15 which messages are to be forwarded, and which are to be discarded. Thus, the identifier translator 15 is both a (identifier) translator and, at the same time, a filter. FIG. 1 shows the mobile station 19 communicating to the identifier translator filtering instructions and data needed to provide the MSISDN for the mobile station 19 (such as a key for decrypting the MSISDN) but does not show a possible real communication path (via the RAN 18 and so on) and so shows the communication as a dotted line. The data needed to provide the MSISDN for the mobile station may be provided to the identifier translator 15 by various means; how such data is provided is outside of the scope of the invention.

Preferably, as mentioned and as shown in FIG. 1, the ESP 11 communicates with the mobile station (via the MMSC 17) using a SOAP (simple object access protocol) envelope (message) including as its body an MM7 message, which in turn includes a core service request. SOAP is an XML (extensible markup language) based protocol that enables activating an application or activating an element of an application (a so-called object) across the Internet, i.e. it enables an application on a computer connected to the Internet to e.g. activate a function, routine, method on another computer connected to the Internet, even though the platforms of the activating computer and the activated computer may be different. Further and briefly, SOAP codifies the practice of using XML and HTTP (hypertext transfer protocol) to invoke methods across networks and computer platforms, including sending and receiving messages over the Internet. (See SOAP version 1.1 at "www.w3.org/TR/SOAP/".) The ESP 11 is shown as the SOAP originator, the identifier translator 15 as a SOAP intermediary (there being possibly others, for performing functions other than identifier translation, such as security functions), and the MMSC 17 as the SOAP ultimate destination. Per the SOAP protocol, after the MMSC 17 processes the SOAP message, all elements of the SOAP message are discarded, and only the body/payload continues on to the mobile station 19.

It should be understood that the invention is not of use only in cases of providing a message to an MMSC 17, but also to any server of the operator network, such as an account server or a location server (the operator network consisting of the modules providing higher level functionality on top of the basic infrastructure provided by the core network). Moreover, the message may not have as its intended destination a mobile station, but may instead be a service request of an operator network server, such as a request of a location server to provide the location of a user of a cell phone subscribed to the operator network. In addition, as already mentioned, it should be understood that the invention is not restricted to having an identifier translator separate and distinct from the operator server that is the ultimate SOAP destination; the invention also encompasses having integral with the operator server functionality that achieves the same end as having a separate and distinct identifier translator 15 as shown in FIG. 1. Specifically, the invention also encompasses having such functionality use a logical link between a user identifier and a user identifier placeholder, as described below in connection with FIG. 2, to provide the message to its final destination (or to respond to the message if the operator network server is the final message destination as well as the ultimate SOAP destination), without ever performing a translation of the SOAP message (so as to create a translated SOAP message), but still performing a user identifier translation (as described below in connection with FIG. 5).

Using SOAP, the basic idea is that the user identifier inside the message from the ESP 11 can be exchanged for (or translated to) a user identifier that is valid for the MMSC 17 or other server of the operator network. The information needed for the identifier translation is conveyed in a well-defined SOAP header entry. The SOAP language element IDTrans (a header element, called a header entry, and more specifically, the IDTrans header entry or the translation header entry, one of possibly several header entries/elements of the SOAP header) is defined by the invention for this purpose, i.e. so as to include the information needed for the identifier translation.

The core service request is included in the SOAP envelope body and typically cannot be altered. It therefore contains what is here called a user identifier placeholder, i.e. a dummy user identifier. The user identifier placeholder is given meaning by a logical link provided via elements in the IDTrans header entry. The elements always included in the IDTrans header entry are:

a SystemID element, containing a link to the XML data containing the user identifier (e.g. user@esp.com) in the source system before translation or to the user identifier in the target system after a translation (although as explained above, a SOAP envelope need not always be created for the target system); the SystemID is typically linked to the user identifier via a language element IDElement included in the IDTrans header entry, although other links are also possible.

a Request element, containing a link to the appropriate part of the core service request message that needs a user identifier as a parameter of the request (and that in place of the user identifier has a user identifier placeholder).

In addition, an optional Target element may be included in the IDTrans header entry, containing a field where the result of the transformation should be inserted; however, in the embodiments described here, a Target element is not used, and instead the SystemID element is used for the source system before translation and for the target system after translation.

The linking for the above elements can be any of the following types:

XML Link Language (Xlink), specified by the attribute equation linkType="XLink". An id attribute with type of IDType (as specified in XMLSchema) is attached to the linked element, and the content of the element to which this attribute is defined for, must contain a URI (Uniform Resource Identifier), as specified in RFC 2396, pointing to the corresponding user identifier in the body, as defined in the Xlink specification. (The protocol syntax must allow the needed linkable attribute to be attached to the linked element in the protocol message.)

A proprietary linking, specified by the attribute equation linkType="value". This is necessary if Xlink attributes are not allowed because of fixed syntax. The value of the user identifier element is used as the identifier for the linking so that the content of the SystemID or Target element must match the content of the linked user identifier element.

XPath linking, specified by the attribute equation linkType="XPath". This is an option in which an XPath location path expression is used in the enclosing element to refer to the user identifier element in the body. With XPath, there is no need to extend the original XMLSchema description of the core service requests with extra attributes attached to the user identifier element, but using XPath may require more processing to resolve.

The optional type attribute specifies the identifier systems in which the source user identifier and the target user identifier values are known, respectively. If this information can be unambiguously determined from the message context, then these attributes may be omitted. These attributes are Uniform Resource Identifiers (URIs).

The following ID types (LibertyToken, LibertyID, Wireless Village, and so on) with sample URI values are defined as part of the invention in embodiments using SOAP:

"http://www.standardbody.org/IDTypes/LibertyToken". This indicates that the source identifier is a Liberty authentication or authorization token containing the identifier of a user either in plaintext or encrypted form. The retrieval method of the identifier from the token is defined by the Liberty specification.

"http://www.standardbody.org/IDTypes/LibertyID". This indicates the source identifier is a valid identifier for a Liberty Identity Provider. In this case it is not a token, but only the extracted identifier as a string. The domain attribute of the SystemID (see below) element may be used to specify the originator node and it should be possible to look up the user identifier known in the target domain. (We assume here that a Liberty-compliant identity provider will be available inside the operator domain for making such look-up queries, which are not, currently, standard Liberty operations, but are likely to be in the future, and then a Liberty Identity Provider external to the operator domain, i.e. external to the cellular communication system, may be used.)

"http://www.standardbody.org/IDTypes/WirelessVillage". This identifier is a valid UserID in the Wireless Village system as a string.

"http://www.standardbody.org/IDTypes/EncryptedMSISDN". This identifier is the same type that is needed in the service request, but is encrypted with a shared secret known by both the originator and the identifier translator node. The encryption method is also known by both parties.

"http://www.standardbody.org/IDTypes/MSISDN". This identifier is a valid MSISDN.

"http://www.standardbody.org/IDTypes/WSS-Token". This identifier can be retrieved from the linked Web Service Security token as specified by the WSS-Core specification provided by the Web Service Security workgroup in OASIS.

In the simplest case, and in the above examples as well, we assume that simple types (as defined by XMLSchema) are used for user identifiers. However, support for complex types is also possible. In such cases, the exact syntactical format of the identifiers before and after the transformation is defined by the type attribute specified above. Note that some of the attribute combinations below may not be usable for a given linkType.

There may be ID types that are not globally unique, but only locally unique, in respect to a given domain. In such a case we need the domain identifier in addition to the user identifier in order to get a globally unique identifier. The domain identifier can be any string. Its format depends on the identifier system binding (as explained below). Domain identifiers may be explicitly included as a domain attribute of the SystemID and Target elements, respectively, if needed (as in when they cannot be determined from context).

If there is no specific place for a given type of identifier in the transport binding (i.e. if there is no SOAP header defined for a given identifier type), then a user identifier can be placed inside the IDTrans element as content of an IDElement element (as mentioned above) if the identifier can be expressed as a string. For easier encoding of binary data, the encoding attribute of the IDElement can be used to specify an encoding algorithm if used. If this value is base64, then the value is encoded with the well-known BASE64 algorithm. IDElement can have an id attribute with XMLSchema's IDtype to be linkable.

In embodiments using SOAP, the function of the identifier translator node 15 is as follows: read the corresponding SOAP header entries; resolve the linked user identifier elements as described above; read the original identifier and determine the source and target domains; run the identifier translation between the source (domain, identifier) pair and target domain and so determine the target user identifier (i.e. the user identifier in the target system); and fill out the missing contents of the SystemID element for the target system by inserting the target user identifier into the appropriate place of the message.

Note that if the attribute linkType is set to "value" or "XPath" and the Target element refers to an element inside the body of the request message, then the identifier translation is transparent to the ultimate destination. If both the SystemID and the Target element refer to the IDElement, then the message body is syntactically fully compatible with any existing protocols; only the IDTrans header entry (an element of the SOAP header) conveys extra information.

Figure 2:
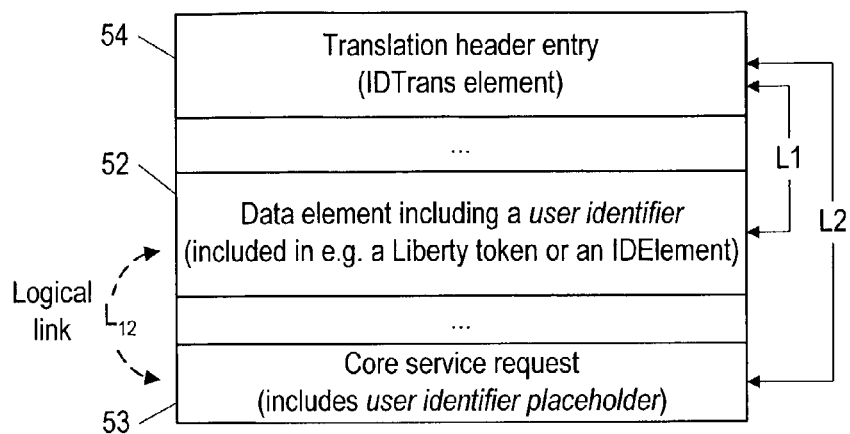
FIG. 2 is a schematic diagram illustrating the overall structure of a message envelope according to the invention.

Referring now to FIG. 2, the invention is illustrated as a way of providing a logical link $L_{12}$ between a data element 52 (included in e.g. a Liberty token or an IDElement) providing a user identifier one the one hand, and a (particular element of a) core service request 53 on the other hand, namely an element including a user identifier placeholder (i.e. e.g. a dummy cell phone number, such as 999 99 999 9999, serving as a space in the message where an actual cell phone number can be inserted); the logical link $L_{12}$ provided by the invention serves as the basis for translating the user identifier between the communication systems (such as between that of a external service provider and that of an operator network), but also makes possible communicating a message without actually performing a translation, as explained below. The logical link $L_{12}$ is provided via a translation header entry 54 (i.e. an IDTrans element) having a link L1 to a data element 52 including a user identifier and a link L2 to a user identifier placeholder in the core service request 53 (which sometimes cannot be altered).

In order for the user identifier known to the first communication system (i.e. that provided by the ESP 11) to be translated for the second communication system (the operator network communication system), there must be some basis by which the identifier translator 15 (which can be at the ultimate SOAP destination) can associate the user identifier provided by the ESP 11 with the user identifier used by the network operator. In some cases, the ESP 11 simply provides as the user identifier in the first communication system the actual user identifier used by the ESP (i.e. e.g. userid@esp.com) and the identifier translator simply sends the user identifier used in the first communication system to the identity provider 16 (FIG. 1), which knows the user's identity in both communication systems and so can exchange one for the other; in other cases, the ESP 11 provides as the user identifier in the first communication system information from which the user identifier in the second system can be immediately determined, but only by the network operator, such as an encrypted form of the user identity in the second communication system or a user authorization token as specified in Liberty Phase 2, and the identity provider 16 (which may also be integral with the SOAP ultimate destination) determines the user identifier in the operator network by decrypting the first user identifier using a key received at some earlier time.

Figure 3:
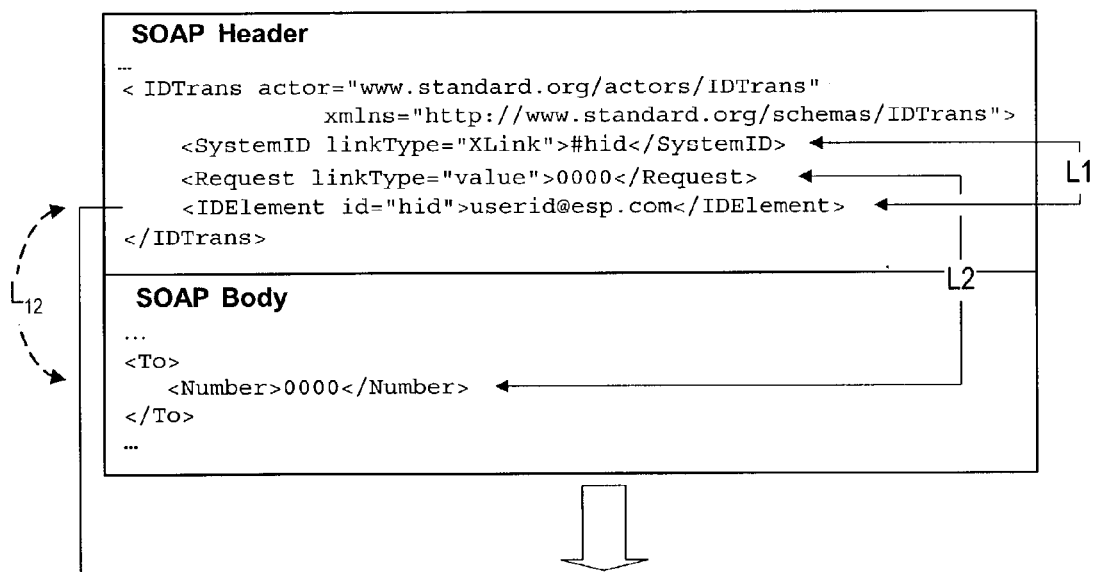
FIGS. 3–6 are schematic diagrams illustrating specific examples of message envelopes according to the invention, including, in FIGS. 3,4 and 6, message envelopes both before and after translation by the identifier translator shown in FIG. 1.
Figure 3:
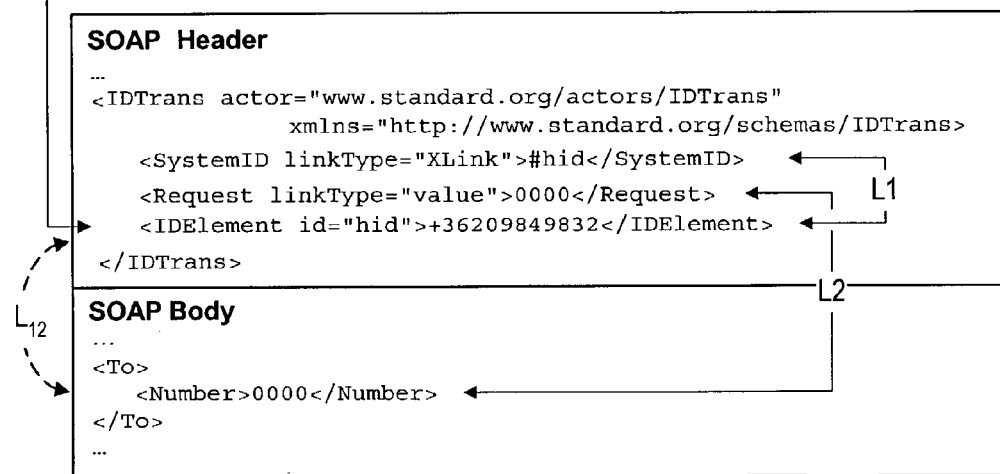

FIGS. 3–6 provide examples showing different modes of operation with different values of the linkType attribute and the SytemID and Target elements. Referring now to FIG. 3, an example is given in which in providing an identifier translation, the SOAP body is not modified by the identifier translator node 15, which is advantageous computationally. However, the XMLSchema description of the service protocol must be extended with the new attributes. Referring again now also to FIG. 2, the data element 52 including the user identifier is usually located in a SOAP header, in a header entry separate from the translation header entry. For example, in FIG. 3, the data element 52 is included in the assertion header entry <lib:Assertion id="la"> . . . </lib:Assertion>, i.e. a liberty token including (in encrypted form) the user identifier used in the second, target communication system, is included in the assertion header entry. The user identifier placeholder is the string "0004200042" in the SOAP body (core service request). When the message is translated according to the invention, the two header entries of the "before" message, namely the translation header entry (IDTrans) and the assertion header entry (Assertion) are discarded, and the actual value of the phone number (i.e. the user identifier) included in the liberty token is inserted into the user identifier placeholder. Note that even after a translation according to the invention, the structure of a SOAP request is similar to the structure before the translation. For example, in FIG. 3, both the "before" and "after" structures include: an IDElement containing a user identifier (either a phone number or an e-mail address); and an IDTrans element (translation header entry) containing a link to the IDElement (including the user identifier) and to the <Number> field (user identifier placeholder) in the core service request. The step of translation transforms the logical link 51 in the "before" (translation) structure to a translated logical link in the "after" structure or inserts the appropriate user identifier in the body of the core service request. The logical linking provided by the invention is more than simple direct linking because: it defines the semantics of the linking (which XLink does not define), i.e. IDTrans defines the first linked element as the element that contains a user identifer (e.g. the phone number of the user) and defines the other linked element as the location of the user identifer data placeholder (e.g. dummy phone number, such as 999 99 999 9999); and it specifies the linking method (e.g. by value or by Xpath), by which the location in the core service request 53 and the location in the data element 52 can be (logically) linked without necessarily adding anything to the existing syntax of already existing protocols.

Figure 4:
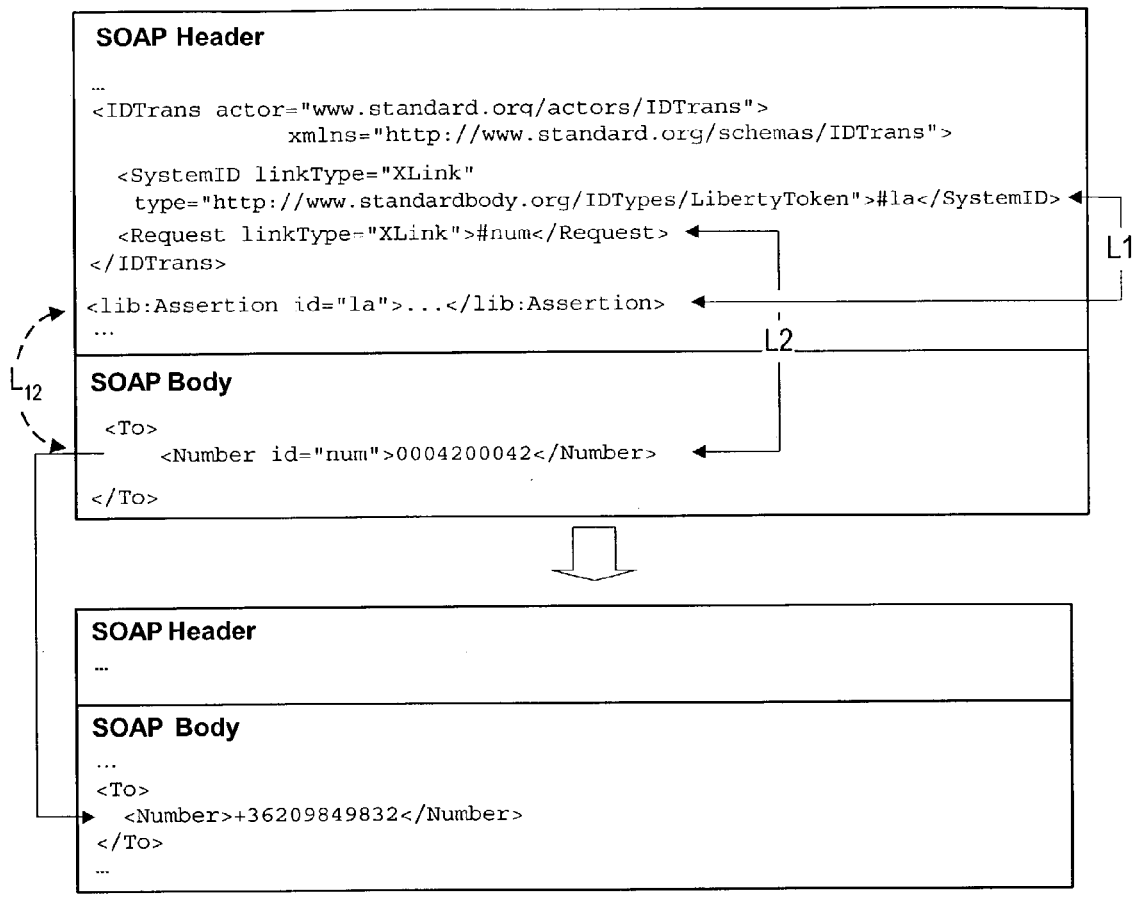

Referring now to FIG. 4, an example is given in which a Liberty authentication assertion contains the user identifier and is translated to an actual phone number by the translator node.

Figure 5:
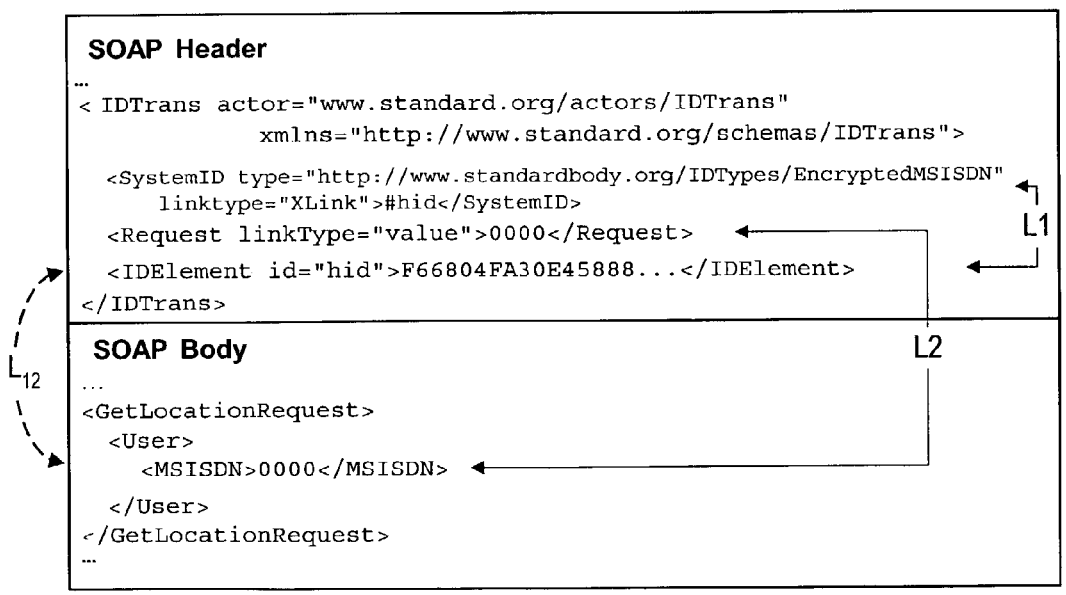

Referring now to FIG. 5, as an example in which an identifier translation is provided but there is no corresponding transformation and forwarding of a SOAP message, consider an ESP asking a network operator for the location of a user known to the ESP by one user identifier, an e-mail address, and known to the network operator by another user identifier, a cell phone number, which is not known to the ESP. In making the request, the ESP provides a clue, namely, in this example, instead of the e-mail address known to the ESP, an encrypted MSISDN; the network operator can then determine the cell phone number (user identifier in the network operator system) from the encrypted MSISDN (user identifier in the ESP system), since the network operator has the key to decrypt the encrypted MSISDN. By preparing a SOAP envelope including a core service request to lookup the location of the user, the ESP is in essence saying the following to the location server of the network operator (e.g. the Vodefone Belgium's location server): "Hi, I'm ESP.com. Here is a SOAP envelope I've created including, as a core service request, a request to lookup the location of a user. I have put into the SOAP envelope a piece of information from an X-Encrypted-MSISDN header of a WAP request coming from a user. I think the X-Encrypted-MSISDN header was added by your WAP gateway. I have added the information (part of the X-Encrypted-MSISDN header) to the <IDElement> element of the SOAP envelope. I don't know anything more about the user, because the user refuses to give out a cell phone number, and so I have to leave empty the <Request> link field in the location lookup request, which would normally contain the cell phone number as a user identifer. Anyway I'm sure you will be able to identify him somehow given the information in the <SystemID> element of the SOAP envelope. So, please let me know in which town the user's cell phone is located (or was located when the phone was switched on). Thank you." Note that in this example a user identifier translation is performed either by an identifier translator separate or integral with the SOAP final destination, which in the example is the location server. However, in some cases, as in the example, what does not happen is a transformation of a SOAP message envelope from the "before" message envelope to an "after" message envelope, and then a forwarding of the translated message envelope, i.e. the "after" SOAP message envelope.

Figure 6:
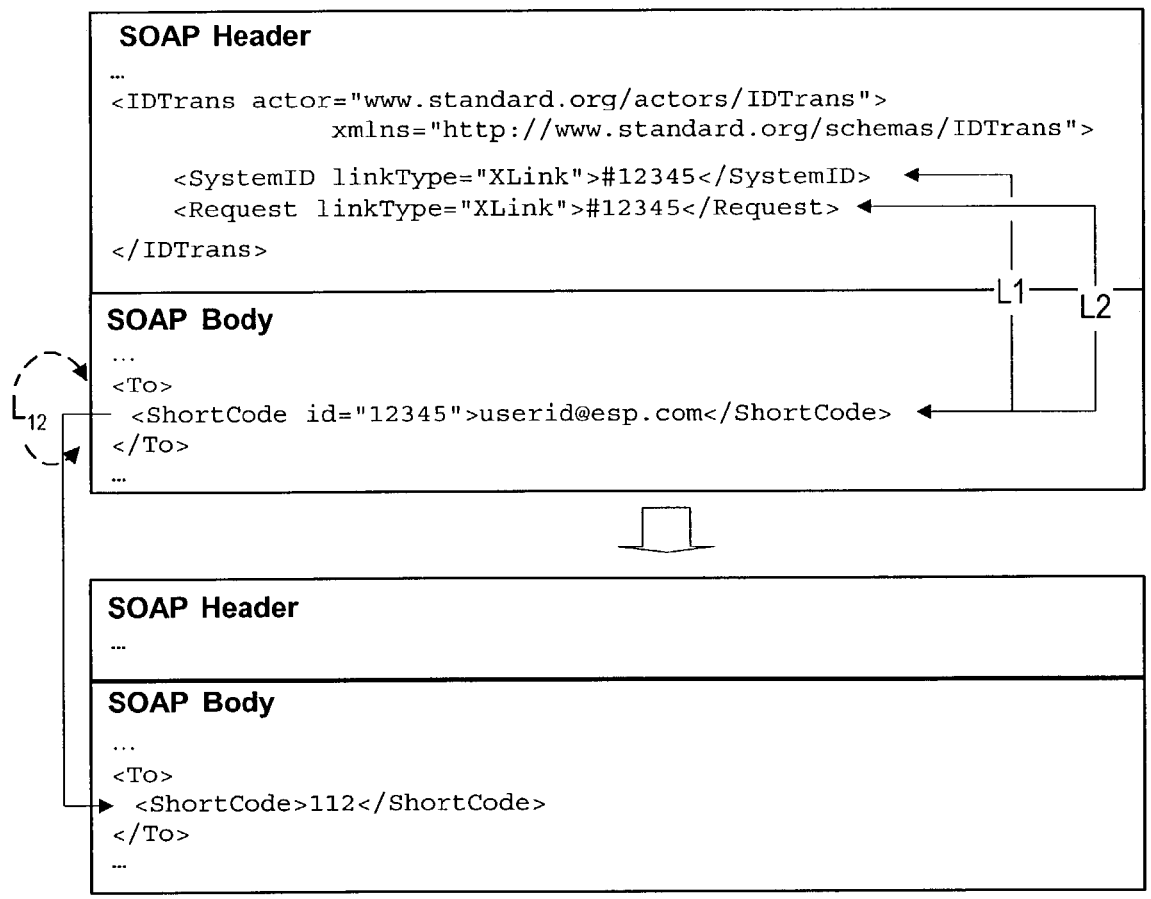

Referring now to FIG. 6, an example is given in which the SOAP body is modified by the SOAP intermediary (the identifier translator 15), which may require a greater processing effort, but no modification is needed for the service protocol schema. Such a message can be used if the syntactical type of the identifier in the protocol and the local identifier at the service provider are compatible. An advantage here is that no processing of the SOAP header is needed at the ultimate destination. In this example, the data element 52 (FIG. 2) including the user identifier and the core service request 53 including the user identifier placeholder are the same.

Referring now to FIG. 7, a flowchart of communicating according to the invention a message between different communication systems is shown as including a first step 71 in which the ESP 11 (FIG. 1), i.e. the SOAP message originator, creates a message envelope encapsulating a message (such as a core service request) for or about a user (i.e. for or about a mobile station 19 of FIG. 1), with the message envelope including a logical link $L_{12}$ between a user identifier provided by the ESP (a user identifier known to the ESP but not necessarily used by the ESP) and a user identifier placeholder (located in the message). In a next step 72, the ESP transmits the message envelope (encapsulating the message) to the identifier translator 15 (which may be integral with the MMSC 17 or other operator network server, i.e. with the SOAP ultimate destination) for delivery to the message final destination. In a next step 73, the identifier translator 15 parses the message envelope, obtains the user identifier provided by the ESP 11, and translates it to the user identifier used by MMSC 17 (i.e. the SOAP ultimate destination), doing so possibly relying on earlier-received information sufficient to translate the user identifier. Then, in a last step 74, the identifier translator 15 optionally inserts the translated user identifier into the message envelope, thereby creating a translated message envelope, and forwards the translated message envelope to the MMSC 17 (or other SOAP ultimate destination). But if the identifier translator 15 is integral with the MMSC 17 (i.e. with the ultimate SOAP destination), then a translated message envelope is not necessarily created.

Referring now to FIG. 8, the step 71 of FIG. 7 is shown in more detail as including a (sub)step 81, in which, when the ESP 11 creates an original message envelope or when the identifier translator 15 translates the message envelope and so creates a translated message envelope, the ESP or identifier translator finds in the message (to be encapsulated in the message envelope) the location of an element containing the user identifier placeholder. In a next step 82, the ESP or identifier translator creates in the message envelope the location of an element containing the user identifier. Then, in a next step 83, the ESP or identifier translator creates a translation header entry including a link L1 to the user identifier and a link L2 to the user identifier placeholder, and thereby creates a logical link $L_{12}$ between the user identifier and the user identifier placeholder.

It is to be understood that the above-described arrangements are only illustrative of the application of the principles of the present invention. In particular, it should be noted that the invention is of use not only in communicating a message between communication systems, but any time a source entity, such as the ESP 11, sends to a target entity, such as the identifier translator 15, a message to or concerning a user when the source entity does not know the user identifier used by the target entity, but instead has some other user identifier by which the user is known to the source entity (including even en encrypted form of the user identifier used by the target entity). Numerous modifications and alternative arrangements may be devised by those skilled in the art without departing from the spirit and scope of the present invention, and the appended claims are intended to cover such modifications and arrangements.

What is claimed is:

1. A method for communicating a message, directed to or concerning a user, from a source entity to a target entity, the user having a first user identifier known to the source entity and a second user identifier used by the target entity, wherein the second user identifier is not known to the source entity, the method comprising the source entity creating a first message envelope encapsulating the message, with the first message envelope containing an element including the first user identifier and an element containing a user identifier placeholder, and also containing a link relating the first user identifier and the user identifier placeholder.

2. A method as in claim 1, wherein the first message envelope is constructed according to a protocol based on an extensible markup language.

3. A method as in claim 1, further comprising an identifier translator parsing the first message envelope to determine the first identifier, and based on the first user identifier, translating the first user identifier into the second user identifier.

4. A method as in claim 1, further comprising the identifier translator creating a second message envelope from the first message envelope, the second message envelope differing from the first message envelope in that it includes an element containing the second user identifier instead of an element containing the first user identifier.

5. The method of claim 1, wherein the first user identifier is the user identifier used by the source entity to identify the user.

6. The method of claim 5, wherein the translation of the first user identifier into the second user identifier is based on the first user identifier and a cross reference to the second user identifier.

7. The method of claim 1, wherein the first user identifier is an encrypted form of the second user identifier.

8. The method of claim 7, wherein the translation of the first user identifier into the second user identifier is based on decrypting at least a part of the first identifier.

9. The method of claim 1, wherein the source entity is part of a source communication system and the target entity is part of a target communication system different from the source communication system.

10. An apparatus, comprising means for performing the method of claim 1.

11. An apparatus, comprising means for performing the method of claim 3.

12. A method for use in communicating a message, directed to or concerning a user, the method comprising:

finding in the message the location of an element containing a user identifier placeholder;

creating in a message envelope for containing the message the location of an element containing a user identifier; and creating a translation header entry including a link to the user identifier and a link to the user identifier placeholder, and thereby creating a logical link between the user identifier and the user identifier placeholder.

13. A method as in claim 12, wherein the message envelope is created according to a protocol based on an extensible markup language.

14. The method of claim 12, wherein the data element containing a value for the user identifier is a Liberty token.

15. The method of claim 12, wherein the data element containing a value for the user identifier is an IDElement element.

16. The method of claim 12, wherein the linking is performed using XPath.

17. The method of claim 12, wherein the linking is performed using "by-value" linking.

18. The method of claim 12, wherein the message is communicated between different communication systems, and the method is used in linking the user identifier and the user identifier placeholder in the message envelope containing the message and the message envelope is passed from one of the communication systems to the other.

19. An apparatus, comprising means for performing the method of claim 12.

20. A data structure for use by a method for communicating a message directed to or concerning a user, the data structure embodied on a computer readable storage structure for execution by a computer processor, and the data structure comprising:

an element containing a user identifier placeholder;

an element containing a user identifier; and a translation header entry including a link to the user identifier and a link to the user identifier placeholder;

wherein the data structure is at least part of a message envelope for the message, and wherein the message including the message envelope is communicated between different communication systems, and the method is used in linking the user identifier and the user identifier placeholder in the message envelope containing the message and the message envelope is passed from one of the communication systems to the other.

21. A data structure as in claim 20, wherein the data structure is created according to a protocol based on an extensible markup language.

22. An apparatus for creating or sending or receiving a signal corresponding to a data structure according to claim 20.

23. A computer program product comprising: a computer readable storage structure embodying computer program code thereon for execution by a computer processor in an apparatus, with said computer program code including instructions for performing a method for communicating a message, directed to or concerning a user, from a source entity to a target entity, the user having a first user identifier known to the source entity and a second user identifier used by the target entity, wherein the second user identifier is not known to the source entity, the computer program comprising instructions for the source entity creating a first message envelope encapsulating the message, with the first message envelope containing an element including the first user identifier and an element containing a user identifier placeholder, and also containing a link relating the first user identifier and the user identifier placeholder.

* * * * *